United States Patent
Hundemer

(10) Patent No.: US 10,291,679 B2
(45) Date of Patent: May 14, 2019

(54) PERMISSION REQUEST FOR SOCIAL MEDIA CONTENT IN A VIDEO PRODUCTION SYSTEM

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 111 days.

(21) Appl. No.: 15/211,153

(22) Filed: Jul. 15, 2016

(65) Prior Publication Data

US 2017/0019367 A1    Jan. 19, 2017

Related U.S. Application Data

(60) Provisional application No. 62/194,171, filed on Jul. 17, 2015, provisional application No. 62/242,593, filed on Oct. 16, 2015.

(51) Int. Cl.
*G06F 17/24* (2006.01)
*G11B 27/00* (2006.01)
(Continued)

(52) U.S. Cl.
CPC .......... *H04L 65/607* (2013.01); *G06F 3/0482* (2013.01); *G06F 3/0486* (2013.01);
(Continued)

(58) Field of Classification Search
CPC ....... H04L 65/607; H04L 51/10; H04L 51/32; H04L 65/4076; H04L 65/602;
(Continued)

(56) References Cited

U.S. PATENT DOCUMENTS

| 2010/0121849 A1 | 5/2010 | Goeldi |
| 2011/0010431 A1* | 1/2011 | Rooks ................. G06F 17/3002 709/218 |

(Continued)

OTHER PUBLICATIONS https://en.wikipedia.org/wiki/Meerkat_(app); Wikipedia Article on Meerkat (app); published May 29, 2015; retrieved Sep. 28, 2016.

(Continued)

*Primary Examiner* — Nicholas R Taylor
*Assistant Examiner* — Chong G Kim
(74) *Attorney, Agent, or Firm* — McDonnell Boehnen Hulbert & Berghoff LLP

(57) ABSTRACT

In one aspect, a method includes a first computing-system (i) selecting a social media (SM) content item associated with a second computing-system, (ii) based on the selected SM content item, determining a SM-platform user-profile identifier associated with the selected SM content item, (iii) using the identifier to determine that the second computing-system has installed, in its data storage unit, an application associated with the first computing-system, (iv) responsive to determining that the second computing-system has installed the application, transmitting, to the second computing-system, an instruction that causes the application to provide, via a user interface of the second computing-system, a permission request concerning use of the selected SM content item, (v) determining that the requested permission was received via the user interface, and (vi) responsive to determining that the requested permission was received via the user interface, facilitating integration of the selected SM content item into a media program.

18 Claims, 8 Drawing Sheets

(51) Int. Cl.
H04L 12/58 (2006.01)
H04L 29/06 (2006.01)
H04L 29/08 (2006.01)
H04N 21/84 (2011.01)
G06F 3/0482 (2013.01)
G06F 3/0486 (2013.01)
H04N 21/234 (2011.01)
H04N 21/262 (2011.01)
H04N 21/854 (2011.01)
H04N 21/2665 (2011.01)

(52) U.S. Cl.
CPC ............ *G06F 17/248* (2013.01); *G11B 27/00* (2013.01); *H04L 51/10* (2013.01); *H04L 51/32* (2013.01); *H04L 65/4076* (2013.01); *H04L 65/602* (2013.01); *H04L 65/604* (2013.01); *H04L 67/02* (2013.01); *H04L 67/10* (2013.01); *H04L 67/18* (2013.01); *H04L 67/306* (2013.01); *H04L 67/42* (2013.01); *H04N 21/23424* (2013.01); *H04N 21/262* (2013.01); *H04N 21/2665* (2013.01); *H04N 21/84* (2013.01); *H04N 21/854* (2013.01)

(58) Field of Classification Search
CPC ....... H04L 65/604; H04L 67/02; H04L 67/10; H04L 67/18; H04L 67/306; H04L 67/42; G06F 3/0482; G06F 3/0486; G06F 17/248; G11B 27/00; H04N 21/23424; H04N 21/2665; H04N 21/262; H04N 21/84; H04N 21/854
USPC ........................................................ 706/206
See application file for complete search history.

(56) References Cited

U.S. PATENT DOCUMENTS

| | | | |
|---|---|---|---|
| 2011/0040760 A1 | 2/2011 | Fleischman et al. | |
| 2011/0276423 A1* | 11/2011 | Davidson ............... | G06Q 30/06 705/26.1 |
| 2013/0014223 A1* | 1/2013 | Bhatia ................. | H04N 21/252 726/4 |
| 2013/0268962 A1 | 10/2013 | Snider et al. | |
| 2013/0304818 A1 | 11/2013 | Brumleve et al. | |
| 2014/0040371 A1 | 2/2014 | Gurevich et al. | |
| 2014/0125703 A1 | 5/2014 | Roveta et al. | |
| 2014/0280564 A1 | 9/2014 | Darling et al. | |
| 2015/0026712 A1* | 1/2015 | Snider ................ | H04N 21/8547 725/14 |
| 2015/0088988 A1* | 3/2015 | Yuan ....................... | H04L 67/02 709/204 |
| 2015/0242518 A1* | 8/2015 | Rosenbaum ...... | G06F 17/30867 707/710 |
| 2016/0034712 A1* | 2/2016 | Patton ................. | G06F 21/6245 726/28 |
| 2016/0149956 A1* | 5/2016 | Birnbaum ............. | H04L 63/101 726/1 |
| 2016/0180113 A1* | 6/2016 | Patton ................. | G06F 21/6245 726/28 |
| 2016/0371471 A1* | 12/2016 | Patton ................. | G06F 21/6245 |

OTHER PUBLICATIONS https://en.wikipedia.org/wiki/Periscope_(app); Wikipedia Article on Periscope (app); published May 26, 2015; retrieved Sep. 28, 2016.
https://about.tagboard.com/live; Tagboard Live Webpage; published Mar. 15, 2015; retrieved Sep. 28, 2016.
https://techcrunch.com/2013/11/25/tagboard-2-0/; Tagboard Revamps Its Cross-Platform Hashtag Aggregator; Anthony Ha; published Nov. 25, 2013; retrieved Sep. 28, 2016.
https://beta.stringr.com; Stringr Homepage; published Apr. 13, 2015; retrieved Sep. 28, 2016.
https://www.vidpresso.com/social; Vidpresso Social Homepage; published Jun. 27, 2015; retrieved Sep. 28, 2016.
https://techcrunch.com/2013/04/03/vidpresso-adds-photo-touchscreen-support-to-help-bring-twitter-to-tv/; Vidpresso Adds Photo, Touchscreen Support to Help Bring Twitter to TV; Ryan Lawler; published Apr. 3, 2013; retrieved Sep. 28, 2016.
https://techcrunch.com/2012/05/07/vidpresso-wants-to-help-tv-stations-put-your-tweets-and-facebook-comments-on-air/; Vidpresso Wants to Help TV Stations Put Your Tweets and Facebook Comments on Air; Frederic Lardinois; published May 7, 2012; retrieved Sep. 28, 2016.
https://techcrunch.com/2014/03/03/vidpresso-ads/; Ads to Broadcast TV; Ryan Lawler; published Mar. 3, 2014; retrieved Sep. 28, 2016.

* cited by examiner

| Story Title | Video-Segment Identifier | Duration | DVE Identifier |
|---|---|---|---|
| STORY A | VS ID A | 00:02:00:00 | DVE ID A |
| STORY B | VS ID B | 00:01:30:00 | |
| STORY C | | 00:00:30:00 | DVE ID C |
| STORY D | VS ID D | 00:00:30:00 | |
| STORY E | VS ID E | 00:00:30:00 | |
| COMMERCIAL BREAK | | | |
| STORY F | VS ID F | 00:02:00:00 | DVE ID F |
| STORY G | | 00:01:30:00 | DVE ID G |
| STORY H | VS ID H | 00:00:30:00 | |
| STORY I | VS ID I | 00:00:30:00 | |

PERMISSION REQUEST FOR SOCIAL MEDIA CONTENT IN A VIDEO PRODUCTION SYSTEM

RELATED DISCLOSURES

This disclosure claims priority to (i) U.S. Provisional Patent Application No. 62/194,171, titled "Video Production System with Social Media Features," filed on Jul. 17, 2015, and (ii) U.S. Provisional Patent Application No. 62/242,593, titled "Video Production System with Content-Related Features," filed on Oct. 16, 2015, both of which are hereby incorporated by reference in their entirety.

USAGE AND TERMINOLOGY

In this disclosure, with respect to all reasonable derivatives of such terms, unless otherwise specified and/or unless the particular context clearly dictates otherwise, each usage of "a" or "an" means at least one, and each usage of "the" means the at least one.

BACKGROUND

Unless otherwise specified, the materials described in this section are not prior art to the claims in this disclosure and are not admitted to be prior art by inclusion in this section.

A video-production system (VPS) can generate and/or output a video program (e.g., a news program) in the form of video content. The VPS can include various components to facilitate this. For example, the VPS can include a scheduling system, which can create and/or edit a program schedule, perhaps based on input received from a user (e.g., a producer or technical director) via a user interface. Further, the VPS can include a sequencing system, which can process records in the program schedule, and based on the processed records, control one or more components of the VPS to facilitate generating and/or outputting the video program.

SUMMARY

In a first aspect, an example method for use in a VPS is disclosed. The method includes: (i) selecting, by a first computing-system, a social media (SM) content item, wherein the SM content item is associated with a second computing-system; (ii) based on the selected SM content item, determining, by the first computing-system, a SM-platform user-profile identifier associated with the selected SM content item; (iii) using, by the first computing-system, the identifier as a basis for determining that the second computing-system has installed, in a data storage unit of the second computing-system, an application associated with the first computing-system; (iv) responsive to determining that the second computing-system has installed the application, transmitting, by the first computing-system, to the second computing-system, an instruction that causes the application to provide, via a user interface of the second computing-system, a permission request concerning use of the selected SM content item; (v) determining, by the first computing-system, that the requested permission was received via the user interface; and (vi) responsive to determining that the requested permission was received via the user interface, facilitating, by the first computing-system, integration of the selected SM content item into a media program.

In a second aspect, a non-transitory computer-readable medium is disclosed. The computer-readable medium has stored thereon instructions that, upon execution by a first computing-system, cause the first computing-system to perform a set of acts including: (i) selecting a SM content item, wherein the SM content item is associated with a second computing-system; (ii) based on the selected SM content item, determining a SM-platform user-profile identifier associated with the selected SM content item; (iii) using the identifier as a basis for determining that the second computing-system has installed, in a data storage unit of the second computing-system, an application associated with the first computing-system; (iv) responsive to determining that the second computing-system has installed the application, transmitting, to the second computing-system, an instruction that causes the application to provide, via a user interface of the second computing-system, a permission request concerning use of the selected SM content item; (v) determining that the requested permission was received via the user interface; and (vi) responsive to determining that the requested permission was received via the user interface, facilitating integration of the selected SM content item into a media program.

In a third aspect, a first computing-system includes a communication interface and the first computing-system is configured to perform a set of acts including: (i) selecting a SM content item, wherein the SM content item is associated with a second computing-system; (ii) based on the selected SM content item, determining a SM-platform user-profile identifier associated with the selected SM content item; (iii) using the identifier as a basis for determining that the second computing-system has installed, in a data storage unit of the second computing-system, an application associated with the first computing-system; (iv) responsive to determining that the second computing-system has installed the application, transmitting, to the second computing-system, via the communication interface, an instruction that causes the application to provide, via a user interface of the second computing-system, a permission request concerning use of the selected SM content item; (v) determining that the requested permission was received via the user interface; and (vi) responsive to determining that the requested permission was received via the user interface, facilitating integration of the selected SM content item into a media program.

BRIEF DESCRIPTION OF THE DRAWINGS

FIG. 5 is a simplified illustration of an example program schedule.

DETAILED DESCRIPTION

I. Overview

Figure 1:
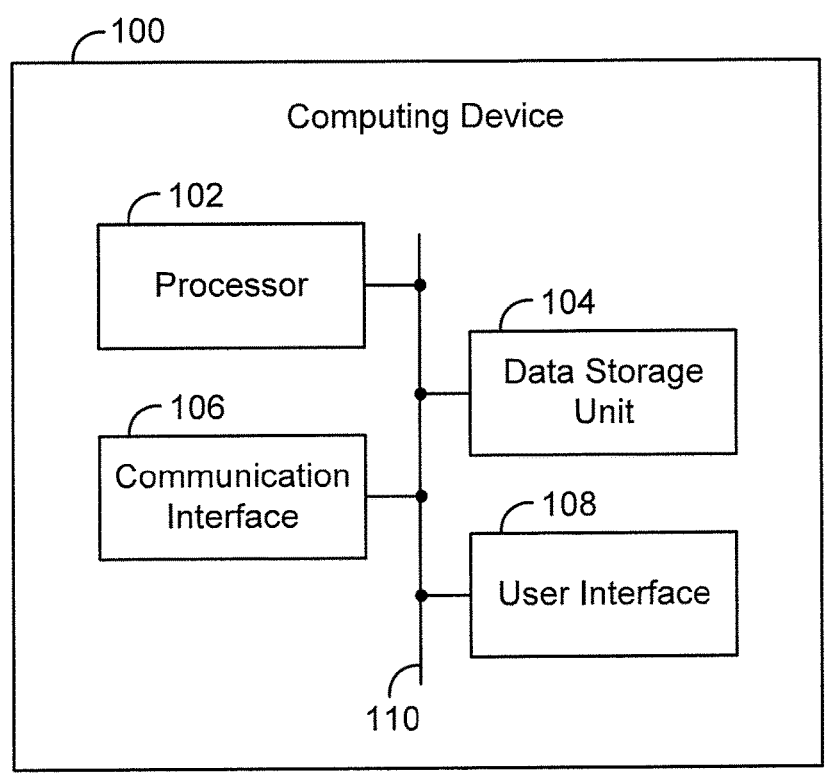
FIG. 1 is a simplified block diagram of an example computing device.

In one aspect, the present disclosure provides a technique for a VPS to request permission from a publisher of a SM content item concerning use of the SM content item, to determine that the permission was given, and to facilitate integrating the SM content item into a video program.

A SM content item is a content item that has been published on a SM platform, which is a computer-based tool that allows users to create, share, and/or exchange content (e.g., in the form of text, pictures, and/or videos) in virtual communities on a computer-based network such as the Internet. Examples of SM platforms include TWITTER™, YOUTUBE™, FACEBOOK™, PERTSCOPE™, INSTAGRAM™, MEERKAT™, LINKEDIN™, and GOOGLE+™. In line with this, a publisher of a SM content item is a user who publishes the SM content item on a SM platform.

A SM platform can maintain a user profile for a publisher. The user profile can be identified by a SM-platform user-profile identifier, such as a username. When the publisher publishes a SM content item on the SM platform, the SM content item can be associated with the identifier. The identifier can also be associated with an end-user device, such as the publisher's mobile phone, which the publisher uses to publish SM content items. Because the SM content item can be associated with the identifier and the identifier can be associated with the end-user device, the SM content item can be associated with the end-user device.

In one example, a VPS includes a SM system and an end-user device. The SM system can select a SM content item, which is associated with the end-user device. The SM system can select the SM content item in various ways.

Based on the selected SM content item, the SM system can determine a SM-platform user-profile identifier associated with the selected SM content item. The SM system can use the identifier as a basis for determining that the end-user device has installed, in a data storage unit of the end-user device, an application associated with the SM system.

Responsive to determining this, the SM system can transmit to the end-user device an instruction that causes the application to provide, via a user interface of the end-user device, a permission request concerning use of the selected SM content item. In one example, the instruction can cause the application to provide the permission request in the form of a prompt for the publisher to allow or deny the SM system use of the selected SM content item in a specified manner. In this instance, the publisher can provide the requested permission (or not provide it) by providing an input to the end-user device via the user interface. This input could be, for instance, a voice command input, a text command input, and/or a touchscreen command input.

Further, the SM system can determine that the requested permission was received via the user interface. In one example, this act can include the SM system receiving from the end-user device a message indicating that the requested permission was received via the user interface. The SM system can store in memory an indication that the requested permission was received.

Responsive to determining that the requested permission was received via the user interface, the SM system can facilitate integrating the selected SM content item into a media program, which the SM can do in various ways.

II. Example Architecture

A. Computing Device

FIG. 1 is a simplified block diagram of an example computing device 100. Computing device 100 can perform various acts and/or functions, such as those described in this disclosure (including the accompanying drawings). Computing device 100 can include various components, such as processor 102, data storage unit 104, communication interface 106, and/or user interface 108. These components can be connected to each other (or to another device, system, or other entity) via connection mechanism 110.

In this disclosure, the term "connection mechanism" means a mechanism that facilitates communication between two or more devices, systems, or other entities. A communication mechanism can be a relatively simple mechanism, such as a cable or system bus, or a relatively complex mechanism, such as a packet-based communication network (e.g., the Internet). In some instances, a connection mechanism can include a non-tangible medium (e.g., where the connection is wireless).

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another other entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. Each connection described in this disclosure can be a direct connection or an indirect connection, the latter being a connection that passes through and/or traverses one or more entities, such as such as a router, switcher, or other network device. Likewise, each transmission described in this disclosure can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system.

Computing device 100 can take various forms, such as a workstation, a desktop computer, a laptop, a tablet, a television, a set-top box, and/or a mobile phone.

B. Computing System

Figure 2:
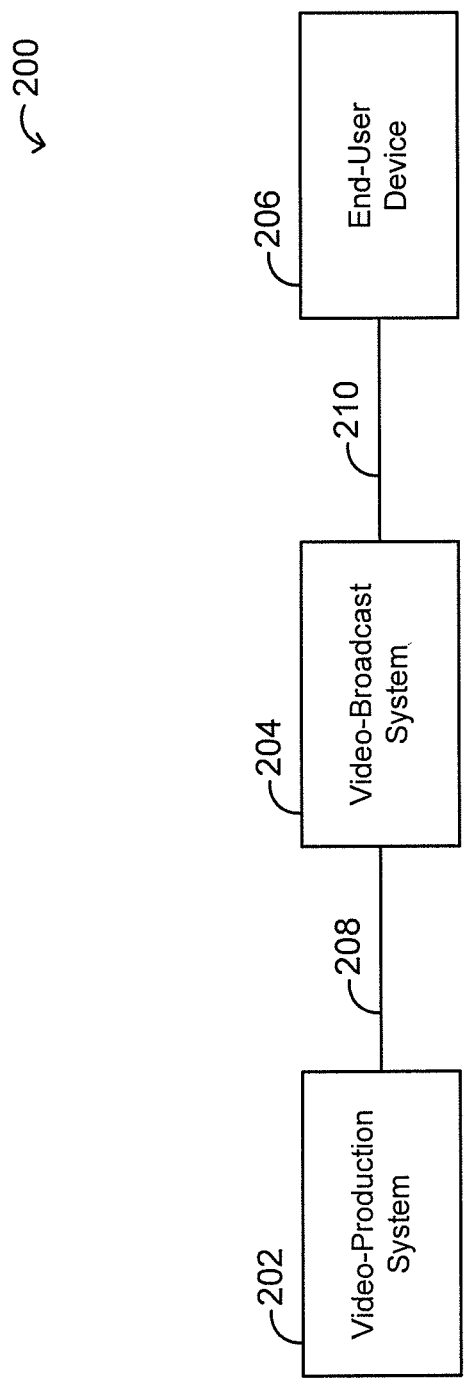
FIG. 2 is a simplified block diagram of an example computing system.

FIG. 2 is a simplified block diagram of an example computing system 200. In this disclosure, a computing system is a system that includes at least one computing device. In some instances, a computing system can include at least one other computing system.

Computing system 200 can include various components, such as VPS 202, video-broadcast system (VBS) 204, and end-user device 206, each of which can be implemented as a computing system. Computing system 200 can also include connection mechanism 208, which connects VPS 202 with VBS 204; and connection mechanism 210, which connects VBS 204 with end-user device 206.

VPS 202 can generate video content, which can serve as or be made part of a video program. VPS can then transmit the video content to VBS 204. VBS 204 can receive the video content and transmit the video content to end-user device 206 for presentation of the video content to an end user. In practice, VBS 204 can transmit video content to a large number of end-user devices for presentation of the video content to a large number of end users.

Video content can be generated, transmitted, and/or received in various ways and/or according to various standards. For example, the act of generating video content can include generating a video stream representing the video content. As another example, the act of transmitting and/or receiving video content can include transmitting and/or receiving a video stream representing the video content, such as over Internet Protocol (IP) or in accordance with the high-definition serial digital interface (HD-SDI) standard. Also, the act of generating, transmitting, and/or receiving video content can include generating, transmitting, and/or receiving an encoded or decoded version of the video content.

Figure 3:
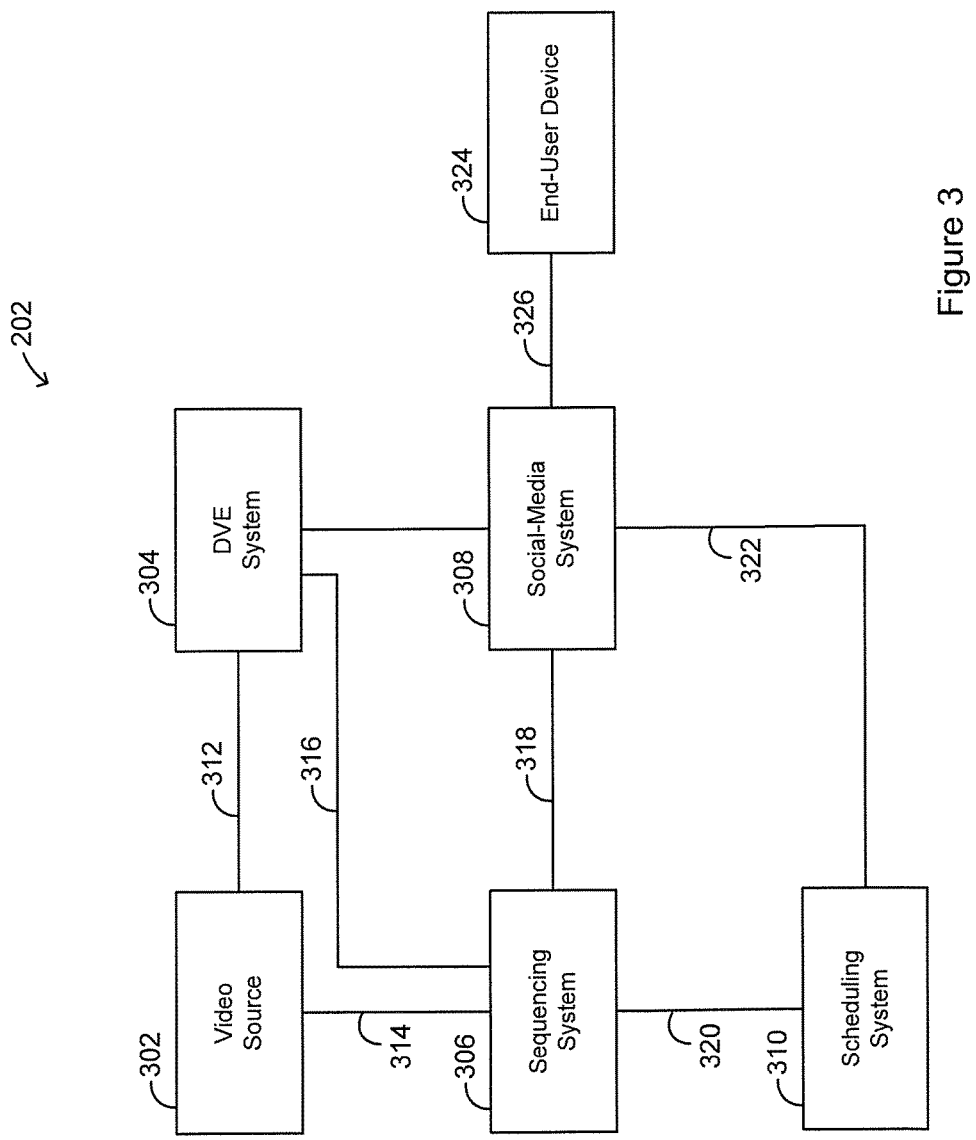
FIG. 3 is a simplified block diagram of another example computing system.

FIG. 3 is a simplified block diagram of an example VPS 202. VPS 202 can include various components, such as video source 302, DVE system 304, sequencing system 306, SM system 308, and scheduling system 310, each of which can be implemented as a computing system. VPS 202 can also include connection mechanism 312, which connects video source 302 with DVE system 304; connection mechanism 314, which connects sequencing system 306 with video source 302; connection mechanism 316, which connects sequencing system 306 with DVE system 304; connection mechanism 318, which connects sequencing system 306 with SM system 308, connection mechanism 320, which connects sequencing system 306 with scheduling system 310; and connection mechanism 322, which connects SM system 308 with scheduling system 310.

In addition, VPS 202 can include an end-user device 324, and can also include connection mechanism 326, which connects end-user device 324 to SM system 308. End-user device 324 can be implemented as a computing system as well, and can take various forms, such as a smart phone, laptop computer, or tablet computer.

Video source 302 can generate and/or output video content, and can transmit the video content to DVE system 304. Video source 302 can take various forms, such as a character generator (CG), a video server, a satellite receiver, a video camera, or a DVE system. Video source 302 can also take the form of DVE system 304 or SM system 308, as described below.

A CG can generate video content based on input data. For example, a character generator can receive weather data and then generate video content that includes the weather data. As another example, a character generator can use an ordered set of content items to generate video content that includes the content items in the specified order. This type of generated video content is sometimes referred to in the industry as a "ticker." The content items can include various types of content, such as text and/or images. The ordered set of content items can be stored in various forms, such as in the form of an extended markup Language (XML) file. An example CG is VizRT Trio/VizRT Engine provided by Viz Rt™ of Bergen, Norway. Another example CG is the CasparCG developed and distributed by the Swedish Broadcasting Corporation (SVT).

A video server can store, retrieve, and/or output video content. An example video server is the K2 server provided by Grass Valley™ of San Francisco, Calif.

DVE system 304 can execute a DVE, which can cause DVE system 304 to generate and/or output video content. DVE system 304 can then transmit the video content to VBS 204. In one example, DVE system 304 can receive first video content from video source 302, and can execute a DVE, which causes DVE system 304 to generate second video content by modifying the first video content. As such, DVE system can generate video content by modifying other video content.

DVE system 304 can modify video content in various ways, such as by overlaying text, images, video, or other content thereon. For example, DVE system 304 can modify video content by overlaying, on a lower right-hand corner region of the video content, a channel logo. As another example, DVE system 304 can modify video content by overlaying, on a lower-third region of the video content, a text box including text. As yet another example, DVE system 304 can modify video content by overlaying, on the video content, a SM content item. As another example, DVE system can modify video content by scaling or re-positioning the video content or a portion thereof.

Figure 4A:
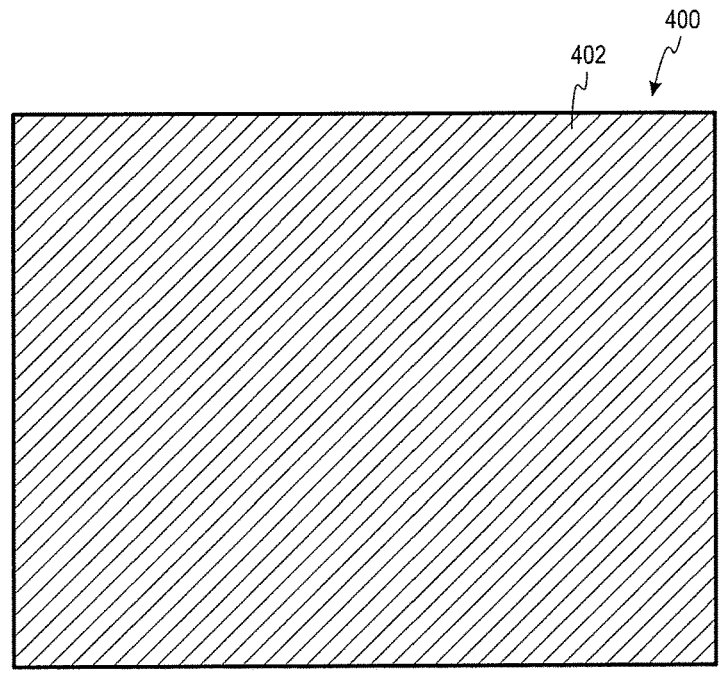
FIG. 4A is a simplified illustration of a frame of an example video segment, where no content is overlaid on the frame.
Figure 4B:
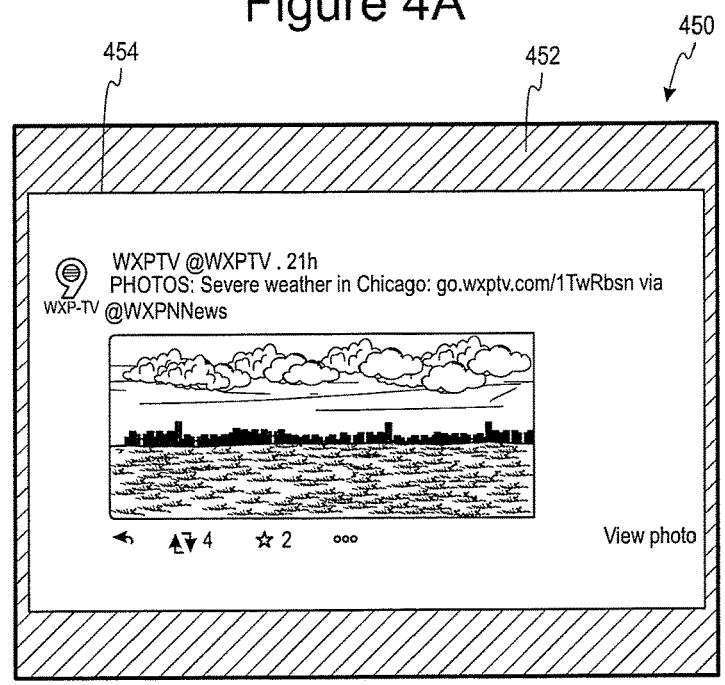
FIG. 4B is a simplified illustration of a frame of an example video segment, where content is overlaid on the frame.

FIGS. 4A and 4B help illustrate the concept of overlaying content on video content. FIG. 4A is a simplified diagram of a frame 400 of video content. Frame 400 includes content 402, but does not include content overlaid on content 402. For comparison, FIG. 4B is a simplified diagram of another frame 450 of video content. Frame 450 includes content 452 and content 454 overlaid on content 452. Content 454 is a SM content item that includes text indicating that there is severe weather in Chicago and that includes a photo of the severe weather.

As noted above, DVE system 304 can execute a DVE, which causes DVE system to generate video content by modifying other video content. However, as another example, DVE system 304 can execute a DVE, which causes DVE system 304 to generate video content without modifying other video content. This type of DVE is sometimes referred to in the industry to as a "full screen DVE."

DVE system 304 can obtain content for use in connection with executing a DVE in various ways. For example, DVE system 304 can retrieve the content from a data storage unit of DVE system 304. As another example, DVE system 304 can receive the content from a video source, such as video source 302 or SM system 308.

In practice, DVE system 304 can execute multiple DVEs in serial fashion. Further, in practice, VPS 202 can include multiple video sources. In one arrangement, each of multiple video sources can be connected to DVE system 304, and DVE system 304 can switch between one or more inputs as appropriate to receive and use video content in connection with DVE system 304 executing a given DVE.

DVE system 304 can also perform other acts and/or functions related to DVEs. For example, DVE system 304 can create and/or edit DVEs, perhaps based on input received from a user via a user interface. When DVE system 304 creates a DVE, DVE system 304 can generate and store corresponding program instructions for later retrieval and execution. As such, the act of DVE system 304 executing a DVE can include DVE system 304 retrieving and executing program instructions corresponding to the DVE.

DVE system 304 can take various forms, such as a production switcher. An example production switcher is the Vision Octane production switcher provided by Ross Video Ltd. of Iroquois, Ontario in Canada.

SM system 308 can perform acts and/or functions related to SM content items. For example, SM system 308 can retrieve, store, and/or edit a SM content item. Further, SM system 308 can generate and/or output a SM content item or video content that includes a SM content item.

Scheduling system 310 can perform acts and/or functions related to scheduling and/or managing the production of a video program. For example, scheduling system 310 can create and/or edit a program schedule of a video program, perhaps based on input received from a user via a user interface. Sequencing system 306 can then process records in the program schedule. This can cause sequencing system 306 to control one or more other components of VPS 202 to facilitate VPS 202 generating and/or outputting video content, which can serve as or be part of a video program. As such, based on a program schedule, sequencing system 306 can control video source 302, DVE system 304 and/or SM system 308.

A program schedule (sometimes referred to in the industry as a "rundown") serves as a schedule or outline of a video program and can include multiple records. A video program can be conceptually divided into multiple logically-separated portions (sometimes referred to in the industry as "stories"). In one example, each portion of the video program can be represented by a separate record of the program schedule. Each record can include various types of data.

FIG. 5 is a simplified diagram of an example program schedule 500. Program schedule 500 includes ten records represented as ten ordered rows. Each record corresponds to a respective portion of a video program, except for one which corresponds to a commercial break. For each portion, the respective record specifies at least one data item that corresponds to that portion of the video program. In particular, each record specifies at least one of a story title, a video-segment identifier, a duration, and a DVE identifier (which can serve as an instruction to execute the identified DVE).

In this disclosure, the term "video segment" means a portion of video content. In some instances, a video segment consists of logically-related video content. For instance, a video segment can be a commercial or a portion of a television show that is scheduled between two commercial breaks.

As shown in FIG. 5, the first record specifies a story title of STORY A, a video-segment identifier of VS ID A, a duration of 00:02:00:00 (in hours::minutes::seconds::frames format), and a DVE identifier of DVE ID A. As such, upon sequencing system 306 processing the first record, sequencing system 306 can cause video source 302 to playout a video segment identified by the video-segment identifier VS ID A for two minutes, and further can cause DVE system 304 to execute a DVE identified by the DVE identifier DVE ID A, which for example, can cause DVE system 304 to overlay specified content on the identified video segment.

As another example, the third record specifies a story title of STORY C, a duration of 00:00:30:00, and a DVE identifier of DVE ID C. As such, upon sequencing system 306 processing the third record, sequencing system 306 can cause DVE system 304 to execute a DVE identified by the DVE identifier DVE ID C, which for example, can cause DVE system 304 to generate and output video content for two minutes.

It should be noted that program schedule 500 has been greatly simplified for the purposes of illustrating certain features. In practice, a program schedule is likely to include significantly more data such as further details regarding DVE execution timing. In some aspects, sequencing system 306 can be configured to process a next record in the program schedule based on input received from a user via a user interface.

VBS 204 can transmit video content to end-user device 206 for presentation of the video content to an end user. In practice, VBS 204 can transmit video content to a large number of end-user devices for presentation of the video content to a large number of end users. VBS 204 can include various components to facilitate this, such as a terrestrial antenna or a satellite, each of which can be implemented as a computing system.

In this disclosure, the term "video broadcast" means the distribution of video content via any means. As such, VBS 204 can transmit video content to end-user device 206 in various ways. For example, VBS 204 can transmit video content to end-user device 206 over-the-air or via a packet-based network such as the Internet.

End-user device 206 can receive video content from VBS 204, and can present the video content to an end-user via a user interface.

Each of the video-based systems or devices described in this disclosure can include or be integrated with a corresponding audio-based system or device. Likewise, the video content described in this disclosure can include or be integrated with corresponding audio content.

III. Example Operations

Computing system 200 and/or components of computing system 200 can perform various acts. These and related features will now be described.

A. SM Content Item Selection and Acquisition

SM system 308 can obtain a SM content item in various ways. In one aspect, SM system 308 can obtain a SM content item from a SM platform by (i) accessing the SM platform, (ii) selecting the SM content item published on the SM platform, (iii) responsive to the selection, receiving information relating to the selected SM content item, (iv) using the received information to retrieve the SM content item from the SM platform, and (v) storing the retrieved SM content item in a data storage unit.

In some examples, SM system 308 can access a SM platform in a manner that allows a user to view, search for, and/or browse SM content items via a user interface, such as by accessing the SM platform via a web browser application. SM system 308 can then select the SM content item based on an input received from a user via a user interface, such as a drag-and-drop input and/or a copy-and-paste input. To implement a drag-and-drop input, for instance, SM system 308 can drag a selectable object associated with the SM content item to a drop-target object, and then SM system 308 can drop the selectable object on the drop-target object. In one implementation, the selectable object can be provided in a first application window displaying the web browser application and the drop-target object can be provided in a second application window displaying a graphical user interface of SM system 308. The graphical user interface of SM system 308 can facilitate operations described herein on retrieved SM content items.

The information relating to the selected SM content item can be any information that facilitates retrieving the SM content item from the SM platform, such as a link to the SM content item for instance. SM system 308 can then retrieve the selected SM content item in various ways, such as by using the link to generate and transmit a request for the SM content item to an application programming interface (API) associated with the SM platform.

The retrieved SM content item can include various types of data such as, for example, (i) data indicating the SM platform from which the SM content item was retrieved (e.g., FACEBOOK™ or TWITTER™), (ii) data identifying the publisher of the SM content item (e.g., an account identifier, such as a username), (iii) a profile picture corresponding to the publisher of the SM content item, (iv) text published by the publisher in connection with the SM content item, (v) an image published by the publisher in connection with the SM content item, (vi) video content published by the publisher in connection with the SM content item, (vii) audio content published by the publisher in connection with the SM content item, (viii) a timestamp indicating a time and/or date at which the SM content item was published on the SM platform, (ix) global positioning system (GPS) coordinates of the publisher when the SM content item was published, (x) GPS coordinates of a location at which an aspect of the SM content item occurred (e.g., a video was filmed or a picture was taken), (xi) a number of other users associated with the publisher on a SM platform (e.g., a number of friends or followers), (xii) an indication of how long the publisher has been a user of a SM platform, (xiii) a timestamp indicating a time and/or date at which an aspect of the SM content item was created (e.g., a time/date a video was recorded or a picture was taken), (xiv) a number of times a SM content item has been shared (e.g., retweeted) by other users of a SM platform, (xv) a number of posts by the publisher on a SM platform, and/or (xvi) any other data that can be integrated into a video program.

Once retrieved, the SM system 308 can store the SM content item in a data storage unit of the SM system 308. In some examples, the SM system 308 can store the SM content item in a database maintained in the data storage unit of the SM system 308 (hereinafter "SMS database"). In such examples, the data retrieved for a SM content item can be stored as a record in the SMS database. The SMS database can have multiple data fields that are each configured to store particular types of data (such as those described above) for the SM content item. Accordingly, SM system 308 can retrieve data for the selected SM content item, parse the data to determine which portions of the data correspond to which fields in the SMS database, and then populate the record in the SMS database with the determined portions of the data in the corresponding fields. The SM system 308 can also assign the record a unique identification (ID) number to facilitate managing the SM content items stored in the SMS database. Depending on the SM content item selected, one or more of the potential fields can be left unpopulated for a stored record in the SMS database.

As noted above, one example of how SM system 308 can select a SM content item is by using a drag-and-drop input. To implement a drag-and-drop input, SM system 308 can drag a selectable object associated with the SM content item to a drop-target object, and then SM system 308 can drop the selectable object on the drop-target object. In one implementation, the selectable object can be provided in a first application window displaying the web browser application and the drop-target object can be provided in a second application window displaying a graphical user interface of SM system 308, and thus the selectable object can be dragged from the first application window to the drop-target object displayed in the second application window and then dropped on the drop-target object. The graphical user interface of SM system 308 can facilitate operations described herein on retrieved SM content items.

In some examples, the act of selecting a SM content item can involve selecting one SM content item from among multiple SM content items stored in a data storage unit. For example, the act of selecting a SM content item can involve selecting the SM content item from among multiple SM content items that were added to the SMS database earlier by way of a drag-and-drop input or another operation. Other examples are possible as well.

B. Permission Requests for SM Content Item

In line with the discussion above, the SM content item that SM system 308 selects can be associated with end-user device 324. In one example, the SM content item can also be associated with a SM-platform user-profile of the publisher of the SM content item, and the SM-platform user-profile can be associated with end-user device 324. To illustrate the relationship between the SM content item, the SM-platform user-profile, and end-user device 324, consider a scenario in which the publisher of the SM content item owns or otherwise operates end-user device 324. In this scenario, the publisher can use end-user device 324 or another computing system to access a SM platform by logging in to their SM-platform user-profile, and can then publish the SM content item on the SM platform via the publisher's SM-platform user-profile.

SM system 308 can then determine, based on the selected SM content item, a SM-platform user-profile identifier associated with the selected SM content item. In some aspects, the SM-platform user-profile identifier can be a unique global identifier assigned to the publisher (namely, assigned to the publisher's SM-platform user-profile) that serves as a way to identify the publisher on every form of the SM platform at issue (e.g., on a web browser, on an application installed on end-user device 324 or on another device, etc.). In these aspects, the SM-platform user-profile identifier can take the form of a personal alphabetic, numeric, or alphanumeric identifier that is different from the publisher's username on the SM platform.

The act of determining the SM-platform user-profile identifier can be performed in various ways. In one example, the act of determining the SM-platform user-profile identifier can include retrieving the SM-platform user-profile identifier using one or more of the techniques discussed above for retrieving other SM data (e.g., requesting and receiving the SM-platform user-profile identifier via an API of the SM platform). Further, in some instances, third parties can provide a web-based tool for determining the SM-platform user-profile identifier. Accordingly, as an alternative technique to obtaining the SM-platform user-profile identifier via an API or server of the SM platform itself, SM system 308 can use such a web-based tool for determining the SM-platform user-profile identifier. For example, SM system 308 can enter a URL or username associated with the publisher's SM-platform user-profile (or with the SM content item itself) into the web-based tool, and the web-based tool can responsively provide SM system 308 with the SM-platform user-profile identifier. Other techniques for determining the SM-platform user-profile identifier are possible as well.

Once SM system 308 has determined the SM-platform user-profile identifier, SM system 308 can then use the SM-platform user-profile identifier as a basis for determining that end-user device 324 has installed an application associated with SM system 308. To facilitate this in practice, for instance, SM system 308 (or VPS 202 in general) can have access to a database that includes information associated with a variety of SM-platform user-profiles and end-user devices. For example, such information can include: (i) a list of SM-platform user-profile identifiers, (ii) for each SM-platform user-profile identifier, an indication of whether the publisher associated with that SM-platform user-profile identifier has the application installed on an end-user device. Accordingly, in some examples, the act of determining that end-user device 324 has installed an application associated with SM system 308 can include referring to the database to determine that the publisher associated with the determined SM-platform user-profile identifier has the application installed on end-user device 324.

The database noted above can be stored in a data storage unit associated with SM system 308, a data storage unit associated with one or more other components of VPS 202, and/or a data storage unit located remotely from VPS 202 but with which VPS 202 is communicatively linked.

In response to SM system 308 determining that end-user device 324 has installed the application at issue, SM system 308 can then transmit to end-user device 324 an instruction that that causes the application to provide, via a user interface of end-user device 324, a permission request concerning use of the selected SM content item. To facilitate transmission of the instruction in practice, for instance, the database discussed above can further include, for each end-user device on which the application is installed, a unique identifier of the end-user device (e.g., an International Mobile Station Equipment Identity (IMEI) number, a Mobile Equipment Identifier (MEID), etc.) that SM system 308 and/or another system or server is configured to use to contact the end-user device. Accordingly, in some examples, the act of transmitting the instruction to end-user device 324 can include referring to the database to look up the unique identifier that is associated to end-user device 324, and then transmitting the instruction to end-user device 324 using its unique identifier. In other examples, the database can include other information that can be used to facilitate identification of end-user devices and transmission of instructions to such end-user devices.

In some implementations, the instruction can cause the application to provide the permission request in the form of a prompt for the publisher to allow or deny SM system 308 access to and/or use of the selected SM content item. For example, the instruction can cause the application to provide the permission request as an audio prompt via an audio user interface of end-user device 324 (e.g., a speaker) and/or as a visual prompt for display via a graphical user interface of end-user device 324 (e.g., a touchscreen). Further, in some aspects, the prompt can include a message describing use of the selected SM content item to the publisher. For instance, the message can state: "A SM System would like to integrate this SM content item into a media program. Would you like to allow the SM System to do this?" Still further, the message can also describe to the publisher how to respond to the permission request (e.g., "Please speak or select 'Yes' or 'No'."). Other messages are possible as well.

Moreover, end-user device 324 can be configured to receive a response to the permission request via the user interface of end-user device 324. For example, the response to the permission request can be received as a voice command input via an audio user interface of end-user device 324 (e.g., a microphone). Additionally or alternatively, the response can be received as a text command input via a text entry user interface (e.g., a physical keyboard component of end-user device 324, or a touchscreen keyboard displayed on a graphical user interface of end-user device 324). Additionally or alternatively, the response can be received as a touchscreen command input via a touchscreen of end-user device 324, where the touchscreen command input is a binary selection of one of two graphical user interface elements displayed on end-user device 324 (e.g., 'Yes' or 'No'). Other examples are possible as well.

Although acts are described above with respect to causing the application associated with SM system 308 to provide the permission request, in other implementations, SM system 308 can use the SM platform associated with the selected SM content item to facilitate the permission request. For example, if the selected SM content item is a FACEBOOK™ content item, SM system 308 can cause a FACEBOOK™ application (or FACEBOOK™ messenger application) installed on end-user device 324 to provide the permission request, such as by sending the publisher a FACEBOOK™ message. Additionally or alternatively, in still other implementations, SM system 308 can provide the permission request in the form of an email sent to an email address associated with the publisher's SM user-profile and/or an email address associated with the publisher's third party email account.

After transmitting the instruction, SM system 308 can then determine that the requested permission was received via the user interface of end-user device 324. In some aspects, upon receipt of the requested permission via the user interface of end-user device 324, end-user device 324 can transmit to SM system 308 a message indicating that the requested permission was received via the user interface. Accordingly, in these aspects, the act of determining that the requested permission was received via the user interface can include receiving, from end-user device 324, a message indicating that the requested permission was received via the user interface and, based on the received message, determining that the requested permission was received via the user interface. Further, once SM system 308 determines that the requested permission was received via the user interface, SM system 308 can then store in memory, such as the database noted above or other data storage, an indication (e.g., a flag) that the requested permission was received.

In response to SM system 308 determining that the requested permission was received via the user interface of end-user device 324, SM system 308 can then facilitate integration of the selected SM content item into a media program. SM system 308, and VPS 202 as a whole, can integrate the selected SM content into a media program in various ways, such as those described below.

Figure 6:
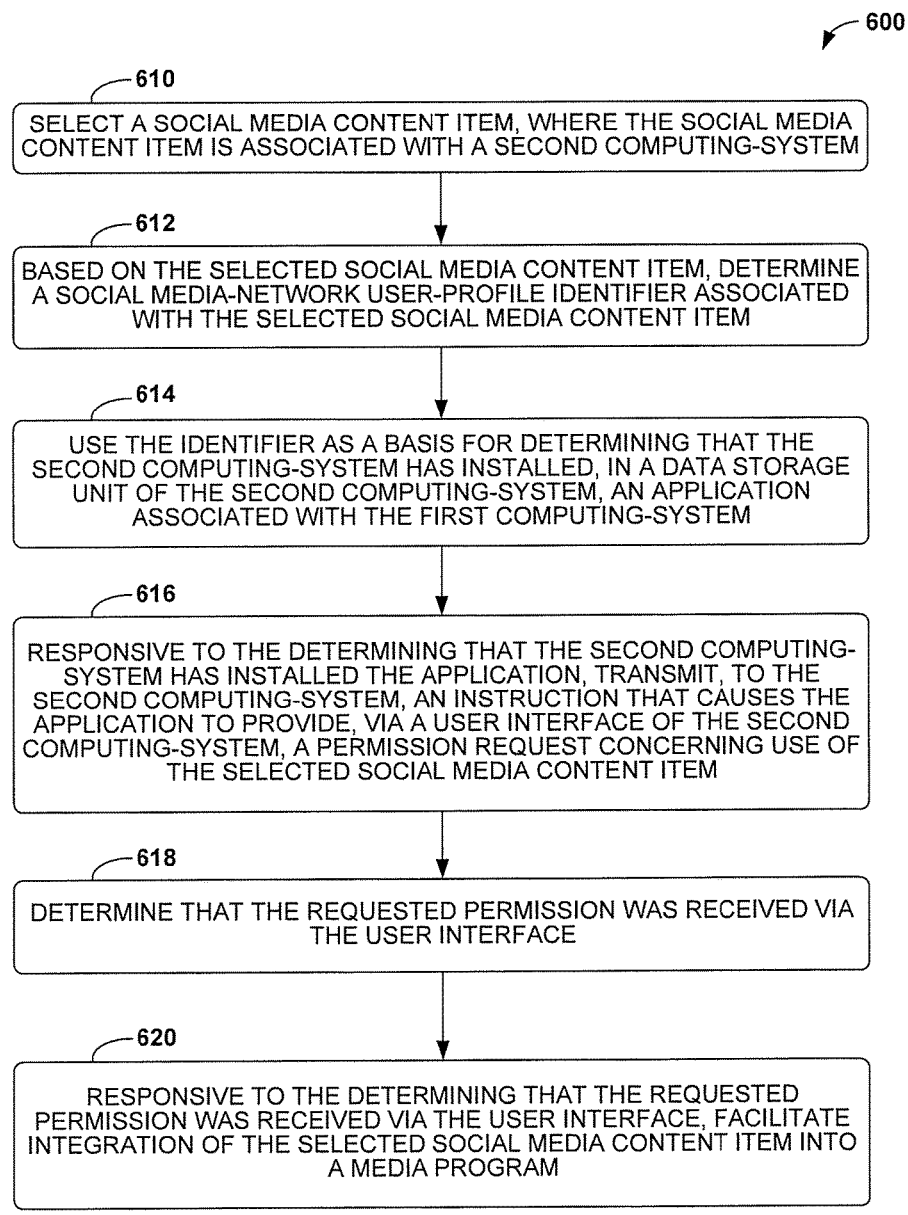
FIG. 6 is a flowchart of an example method.

FIG. 6 is a simplified illustration of an example flowchart for permission requests for content in a VPS. In an example implantation, a first computing-system such as SM system 308 performs the illustrated acts, although in other implementations, one or more other systems (e.g., other component(s) of VPS 202) can perform some or all of the illustrated acts.

As shown in FIG. 6, at block 610, the first computing-system (e.g., SM system 308) selects a SM content item, where the SM content item is associated with a second computing-system (e.g., end-user device 324).

Next, at block 612, based on the selected SM content item, the first computing-system determines a SM-platform user-profile identifier associated with the selected SM content item.

At block 614, the first computing-system then uses the identifier as a basis for determining that the second computing-system has installed, in a data storage unit of the second computing-system, an application associated with the first computing-system.

Further, at block 616, responsive to the determining that the second computing-system has installed the application, the first computing-system transmits, to the second computing-system, an instruction that causes the application to provide, via a user interface of the second computing-system, a permission request concerning use of the selected SM content item.

Still further, at block 618, the first computing-system determines that the requested permission was received via the user interface.

Lastly, at block 620, responsive to the determining that the requested permission was received via the user interface, the first computing-system facilitates integration of the selected SM content item into a media program.

C. SM Content Item Integration

Once the SMS database is populated with one or more SM content items, SM system 308 can prepare the SM content item(s) for integration into the video program. This process can include SM system 308 selecting a template from among multiple templates to determine an arrangement and/or layout for presenting the SM content item(s) in the video program. The templates can include graphics and/or animations that are pre-formatted to allow for aspects of one or more SM content items to be incorporated by a CG in pre-defined ways. For example, a template can define respective positions at which text, images, and/or videos of the SM content item can be overlaid on a video segment of the video program. The template can also define an order in which different SM content items will be presented during the video program. Thus, video programs (e.g., news stories) can easily be produced by leveraging a previously created template. This can save time and maintain format consistency across multiple video programs and/or portions thereof.

According to some aspects, the template can be modified by a user of SM system 308 (e.g., a producer or technical director) in various ways. According to additional aspects, the template can also be selected before the SM content items are selected.

Figure 7:
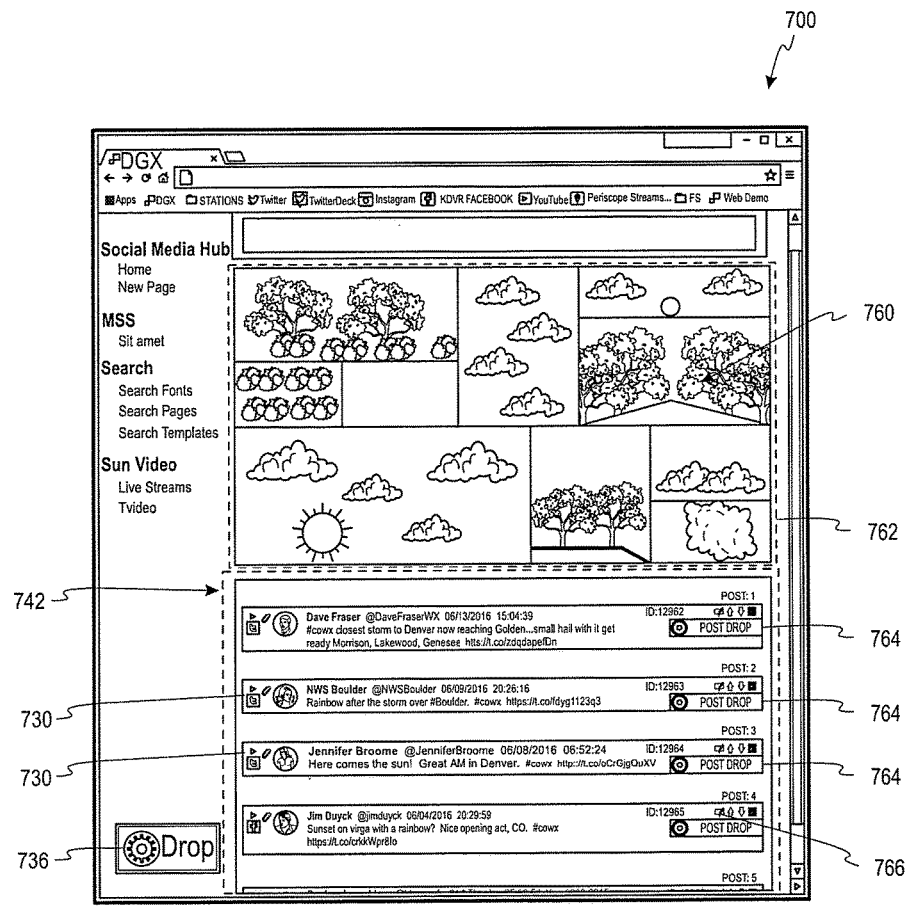
FIG. 7 is a simplified illustration of an example user interface of a SM system.

FIG. 7 illustrates an example graphical user interface 700 including a template 760 populated with images corresponding to SM content items 730. The user interface 700 can also include a list 742 having multiple slots populated with the SM content items 730. In some aspects, each image location in the template can be associated with a respective slot on the list 742. As such, the image displayed in a particular location in the template can be the image of the SM content item occupying the slot associated with that location.

As shown in FIG. 7, each slot includes a respective drop-target object 764 to facilitate selecting a SM content item for that slot on the list 742. Further, each drop-target object 764 (and, thus, each slot) is associated with a different, respective record location in a SMS database.

In one aspect, the drop-target objects 764 can be utilized to add SM content items from a web browser application, for example, as described above with respect to FIGS. 6 to 7C. Accordingly, each drag-and-drop input received by SM system 308 stores a record in the SMS database, populates the list with information for the selected SM content item, and populates the template with an image. In this way, the list, the template, and the SMS database can be populated with a SM content item at the same time. In the event that a new SM content item is dragged-and-dropped to a slot that already includes another SM content item, SM system 308 can replace the other SM content item with the new SM content item in the slot and overwrite the associated record in the SMS database with the data of the new SM content item. In another aspect, the drop-target objects 764 can be utilized to add SM content items already stored in the SMS database.

The example user interface 700 also includes a drop-target object 736. Responsive to the user dragging and dropping a SM content item on the drop-target object 736, the SM data obtained for the SM content item can be stored dynamically stored in an available storage location within the SMS database.

The user interface of SM system 308 can include a preview window 762 that displays a selected template populated with one or more selected SM content items. In this way, a user can determine how the SM content item(s) will appear when integrated into the video program and determine whether any modifications should be made. In some instances, it may not be appropriate or desirable to integrate an entire SM content item into the video program. For example, the text obtained for the SM content item can include a URL that the user may wish to omit to provide a cleaner presentation of the SM content item during the video program. As another example, the text of the SM content item may include vulgarities or personal information that the user may wish to omit from the video program.

Figure 8:
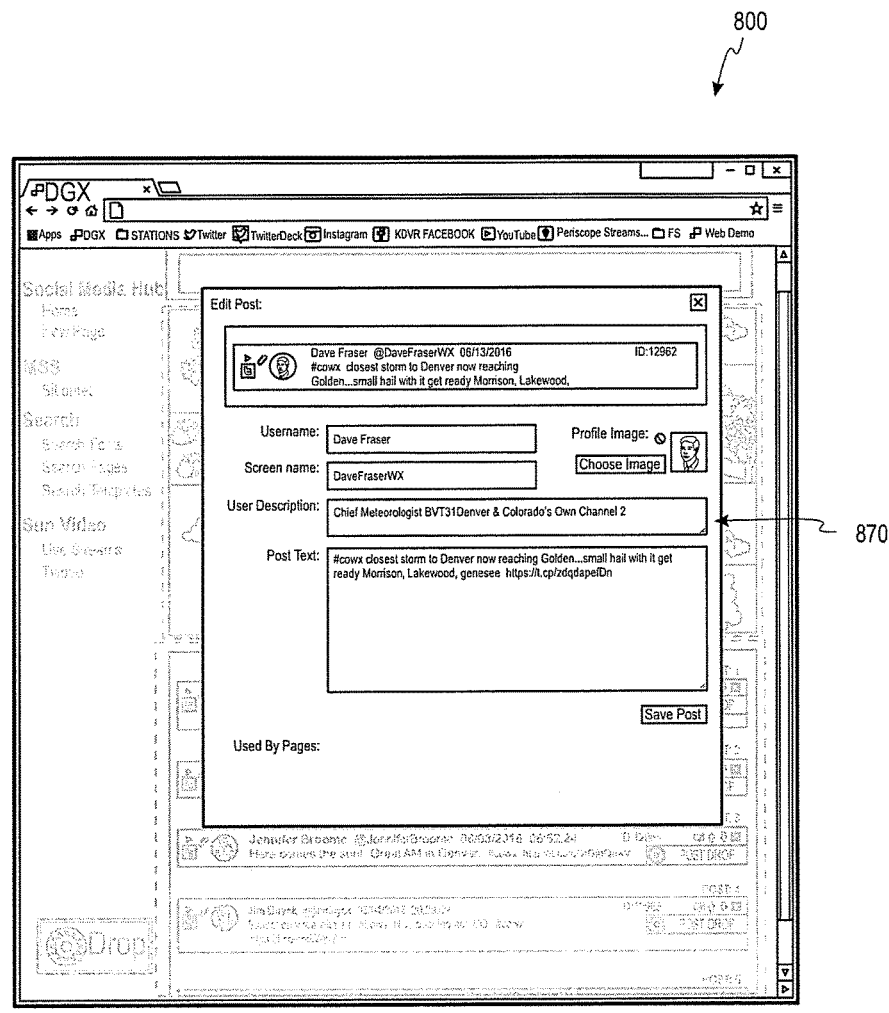
FIG. 8 is simplified illustration of another example user interface of a SM system.

The user interface of SM system 308 can facilitate modifying one or more aspects of a SM content item. In one example implementation, the user interface can display a list of SM content items that have been selected for integration into the video program (e.g., the list 742 in FIG. 7). In this example, for each of the listed SM content items, the user interface can also include an edit button 766. When the edit button 766 is selected for a particular SM content item, the SM system 308 can provide one or more editable data fields displaying the data stored in the SMS database for that SM content item. An example user interface 800 providing editable data fields 870 is illustrated in FIG. 8.

To modify the text associated with a particular SM content item, the user can modify the text displayed in an editable text field of the user interface for that SM content item. Responsive to the user modifying the text in the user interface, SM system 308 can automatically modify the corresponding data stored in the SMS database in a consistent manner. In other examples, other aspects of the SM content item (e.g., videos, images, or audio files) can be modified via the user interface to cause SM system 308 to modify corresponding data stored in the SMS database. In some examples, any modifications to the SM content item can be shown in real-time in the preview window 762 of the user interface for SM system 308.

Typically, SM platforms provide data for SM content items in a common web browser file format such as, for example, HTML, HTML5, or JavaScript. On the other hand, one or more components of the VPS 202 can utilize an entirely different file format to playout videos, text, or images. SM system 308 can facilitate integrating SM content items into the video program, at least in part, by handling these formatting differences. For example, SM system 308 can include a CG that (i) displays a SM content item in its native web browser file format in the preview window of the user interface but (ii) reformats the SM content items to a standard broadcast format for display in the video program. Such a CG allows the data obtained for a SM content item to be stored in the SMS database in the format in which it is received from the SM platform. Because the SM content item does not need to be reformatted until the SM content item is ready to be integrated into the video program, SM system 308 can reduce the processing workload and time for preparing the SM content item.

Once a SM content item is obtained and prepared, SM system 308 can facilitate integrating the SM content item into the video program in various ways. According to some aspects, a SM content item can be integrated into the video program via a video camera. In practice, a SM content item can be displayed on a display device located within the field of view of the video camera (e.g., on a set where filming occurs for the video program). For example, the SM content item can be displayed on a touch screen device, which allows an on-air presenter to interact with the SM content item. To facilitate the presenter's interactions with the SM content item, SM system 308 can be programmed with instructions that cause predefined actions in response to predetermined touch commands.

In one example, the touch screen can initially display multiple small tiles, each representing a different SM content item. In this example, the SM content items can relate to weather conditions captured in photographs published on SM platforms by various different publishers. As such, each tile can display a different photograph. The position and ordering of the small tiles can be determined by a template selected for the display of the SM content items. The selected template can also include programming instructions that allows the commands provided via the touch screen display to cause predefined actions for the displayed SM content items. For example, if a meteorologist taps on one of the small items a first time, the programming instructions can cause the tile to expand so as to enlarge the photograph and perhaps display additional information associated with the SM content item (e.g., a username, time, location, and/or text published in connection with the SM content item). Other commands can cause an expanded tile to return to its initial size and position in this example. As the meteorologist interacts with the SM content items displayed on the touch screen, a camera can generate a video output including these interactions and thereby integrate the SM content items into the video program.

In some examples, a SM content item can be integrated into the video program via DVE system 304 executing a DVE. To do so, SM system 308 can facilitate integrating a selected template and a SM content item into the program schedule maintained by the scheduling system 310. The program schedule can include multiple Media Object Server Communication Protocol ("MOS Protocol") objects that collectively define various content items and actions scheduled to occur for the video program. To facilitate integration of the template and the SM content item, SM system 308 can facilitate transforming the selected template and SM content item into a MOS object. In practice, this can be achieved by creating a record in a scheduling database having appropriate MOS protocol fields populated by references to the SM fields in the SMS database. In one example implementation, SM system 308 can create the record in the scheduling database in response to the user dragging-and-dropping a selectable object in the user interface of the SM system into the scheduling system. Other example mechanisms for creating a MOS object based on SM content items are also contemplated.

The MOS object can include programming instructions that correspond to a sequence for playing out multiple states of the SM content items and the template. Based on such instructions, sequencing system 306 can be employed to step through the different states (e.g., in response to a user provided input).

The SM content item and the template also can be integrated into the video program via a DVE system of the video-broadcast system 204. In this context, the SM content item can be integrated in a manner that persistently displays the SM content item even if the video program is not being broadcasted (e.g., during commercial breaks). For example, such implementations can be utilized to display SM content items related to amber alerts, severe weather warnings, and/or public safety advisories.

IV. Example Variations

Although some of the acts and/or functions described in this disclosure have been described as being performed by a particular entity, such acts and/or functions can be performed by any entity, such as those described in this disclosure. Further, although the described acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the described acts and/or functions need to be performed to achieve one or more of the benefits provided by this disclosure, and therefore not all acts and/or functions are required.

Although certain variations have been discussed in connection with one or more example of this disclosure, such variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:
    selecting, by a social media (SM) computing-system of a video-production system (VPS), a SM content item, wherein the SM content item is associated with an end-user device;
    based on the selected SM content item, determining, by the SM computing-system, a SM-platform user-profile identifier associated with the selected SM content item;
    using, by the SM computing-system, the identifier as a basis for determining that the end-user device has installed, in a data storage unit of the end-user device, an application associated with the SM computing-system;
    responsive to the determining that the end-user device has installed the application, transmitting, by the SM computing-system, to the end-user device, an instruction that causes the application to provide, via a user interface of the end-user device, a permission request concerning use of the selected SM content item;
    determining, by the SM computing-system, that the requested permission was received via the user interface; and
    responsive to the determining that the requested permission was received via the user interface, facilitating, by the SM computing-system, integration of the selected SM content item into a media program, wherein the media program includes video content, and wherein facilitating integration of the selected SM content item into the media program comprises overlaying, on the video content, the selected SM content item.

2. The method of claim 1, wherein selecting the SM content item comprises dragging and dropping an object associated with the SM content item.

3. The method of claim 2, further comprising:
before selecting the SM content item:
accessing, by the SM computing-system, via a web browser application, a SM platform associated with the SM content item;
displaying, by the SM computing-system, the web browser application in a first application window of a user interface; and
displaying, by the SM computing-system, a drop-target object in a second application window of the user interface,
wherein dragging and dropping the object comprises (i) dragging the object from the first application window to the drop-target object displayed in the second application window and (ii) dropping the object on the drop-target object.

4. The method of claim 1, further comprising:
before selecting the SM content item, storing, by the SM computing-system, in a data storage unit of the SM computing-system, a plurality of SM content items,
wherein selecting the SM content item comprises selecting the SM content item from the plurality of SM content items stored in the data storage unit of the SM computing-system.

5. The method of claim 1, wherein the SM content item is associated with a SM-platform user-profile, and wherein the SM-platform user-profile is associated with the end-user device.

6. The method of claim 1, wherein the SM computing-system determining that the requested permission was received via the user interface comprises:
receiving, by the SM computing-system, from the end-user device, a message indicating that the requested permission was received via the user interface, and
based on the received message, determining, by the SM computing-system, that the requested permission was received via the user interface.

7. The method of claim 1, further comprising:
storing, by the SM computing-system, an indication that the requested permission was received.

8. A non-transitory computer readable medium having stored thereon instructions that, upon execution by a social media (SM) computing-system of a video-production system (VPS), cause the SM computing-system to perform a set of acts comprising:
selecting a SM content item, wherein the SM content item is associated with an end-user device;
based on the selected SM content item, determining a SM-platform user-profile identifier associated with the selected SM content item;
using the identifier as a basis for determining that the end-user device has installed, in a data storage unit of the end-user device, an application associated with the SM computing-system;
responsive to the determining that the end-user device has installed the application, transmitting, to the end-user device, an instruction that causes the application to provide, via a user interface of the end-user device, a permission request concerning use of the selected SM content item;
determining that the requested permission was received via the user interface; and
responsive to the determining that the requested permission was received via the user interface, facilitating integration of the selected SM content item into a media program, wherein the media program includes video content, and wherein facilitating integration of the selected SM content item into the media program comprises overlaying, on the video content, the selected SM content item.

9. The non-transitory computer readable medium of claim 8, wherein selecting the SM content item comprises dragging and dropping an object associated with the SM content item.

10. The non-transitory computer readable medium of claim 9, the set of acts further comprising:
before selecting the SM content item:
accessing, via a web browser application, a SM platform associated with the SM content item;
displaying the web browser application in a first application window of a user interface; and
displaying a drop-target object in a second application window of the user interface,
wherein dragging and dropping the object comprises (i) dragging the object from the first application window to the drop-target object displayed in the second application window and (ii) dropping the object on the drop-target object.

11. The non-transitory computer readable medium of claim 8, the set of acts further comprising:
before selecting the SM content item, storing, in a data storage unit of the SM computing-system, a plurality of SM content items,
wherein selecting the SM content item comprises selecting the SM content item from the plurality of SM content items stored in the data storage unit of the SM computing-system.

12. The non-transitory computer readable medium of claim 8, wherein the SM content item is associated with a SM-platform user-profile, and wherein the SM-platform user-profile is associated with the end-user device.

13. The non-transitory computer readable medium of claim 8, wherein the SM computing-system determining that the requested permission was received via the user interface comprises:
receiving, from the end-user device, a message indicating that the requested permission was received via the user interface, and
based on the received message, determining that the requested permission was received via the user interface.

14. The non-transitory computer readable medium of claim 8, the set of acts further comprising:
storing an indication that the requested permission was received.

15. A social media (SM) computing-system of a video-production system (VPS), the SM computing-system comprising:
a communication interface,
wherein the SM computing-system is configured to perform a set of acts comprising:
selecting a SM content item, wherein the SM content item is associated with an end-user device;

based on the selected SM content item, determining a SM-platform user-profile identifier associated with the selected SM content item;

using the identifier as a basis for determining that the end-user device has installed, in a data storage unit of the end-user device, an application associated with the SM computing-system;

responsive to the determining that the end-user device has installed the application, transmitting, to the end-user device, an instruction that causes the application to provide, via a user interface of the end-user device, a permission request concerning use of the selected SM content item;

determining that the requested permission was received via the user interface; and responsive to the determining that the requested permission was received via the user interface, facilitating integration of the selected SM content item into a media program, wherein the media program includes video content, and wherein facilitating integration of the selected SM content item into the media program comprises overlaying, on the video content, the selected SM content item.

16. The SM computing-system of claim 15, wherein the SM content item is associated with a SM-platform user-profile, and wherein the SM-platform user-profile is associated with the end-user device.

17. The SM computing-system of claim 15, wherein determining that the requested permission was received via the user interface comprises:

receiving, from the end-user device, a message indicating that the requested permission was received via the user interface, and based on the received message, determining that the requested permission was received via the user interface.

18. The SM computing-system of claim 15, to the set of acts further comprising:

storing an indication that the requested permission was received.

* * * * *